(12) United States Patent
Shimizu

(10) Patent No.: US 6,873,358 B1
(45) Date of Patent: Mar. 29, 2005

(54) ELECTRONIC ZOOM IMAGE INPUT METHOD

(75) Inventor: Eriko Shimizu, Yokohama (JP)

(73) Assignee: Viewmagic Incorporated, Yokohama (JP)

(*) Notice: Subject to any disclaimer, the term of this patent is extended or adjusted under 35 U.S.C. 154(b) by 0 days.

(21) Appl. No.: 09/331,008

(22) PCT Filed: Dec. 15, 1997

(86) PCT No.: PCT/JP97/04611
§ 371 (c)(1),
(2), (4) Date: Jul. 9, 1999

(87) PCT Pub. No.: WO98/27718
PCT Pub. Date: Jun. 25, 1998

(30) Foreign Application Priority Data

Dec. 17, 1996 (JP) .............................. 8/359509
Dec. 8, 1997 (JP) .............................. 9/351958

(51) Int. Cl.[7] .................... H04N 5/262; H04N 5/225; G03B 13/02
(52) U.S. Cl. .................. 348/240.99; 348/340; 359/745
(58) Field of Search ................ 348/240, 340, 348/360, 335, 240.1, 240.2; 359/745, 748; 396/71

(56) References Cited

U.S. PATENT DOCUMENTS

| 4,554,585 A | * | 11/1985 | Carlson | 348/169 |
| 4,897,722 A | * | 1/1990 | Flory | 348/434.1 |
| 4,962,429 A | * | 10/1990 | Lemonier | 348/340 |
| 5,124,840 A | * | 6/1992 | Trumbull et al. | 359/472 |
| 5,175,616 A | * | 12/1992 | Milgram et al. | 348/47 |
| 5,309,241 A | * | 5/1994 | Hoagland | 348/222.1 |
| 5,537,149 A | * | 7/1996 | Teraoka et al. | 348/556 |
| 5,668,666 A | * | 9/1997 | Suzuki | 359/674 |
| 5,673,086 A | * | 9/1997 | Fukuoka et al. | 348/445 |
| 5,696,560 A | * | 12/1997 | Songer | 348/436 |
| 5,905,530 A | * | 5/1999 | Yokota et al. | 348/240.99 |
| 5,956,091 A | * | 9/1999 | Drewery et al. | 348/445 |

FOREIGN PATENT DOCUMENTS

JP  07-067025  * 10/1995  .......... H04N/5/232

* cited by examiner

Primary Examiner—Andrew Christensen
Assistant Examiner—Nhan Tran

(57) ABSTRACT

An electronic zoom image input method that enables zooming without declining the resolution by receiving an input image transmitted through a fixed focal distance optical system having a function of compressing the circumferential part of the input image by means of a photo detector with a uniform pixel density and subjecting the received image to image correction and conversion to obtain an output image. Three dimensional image input system is realized by preparing each image input system of both left and right view with this electronic zoom image input method.

7 Claims, 6 Drawing Sheets

(a)

(b)

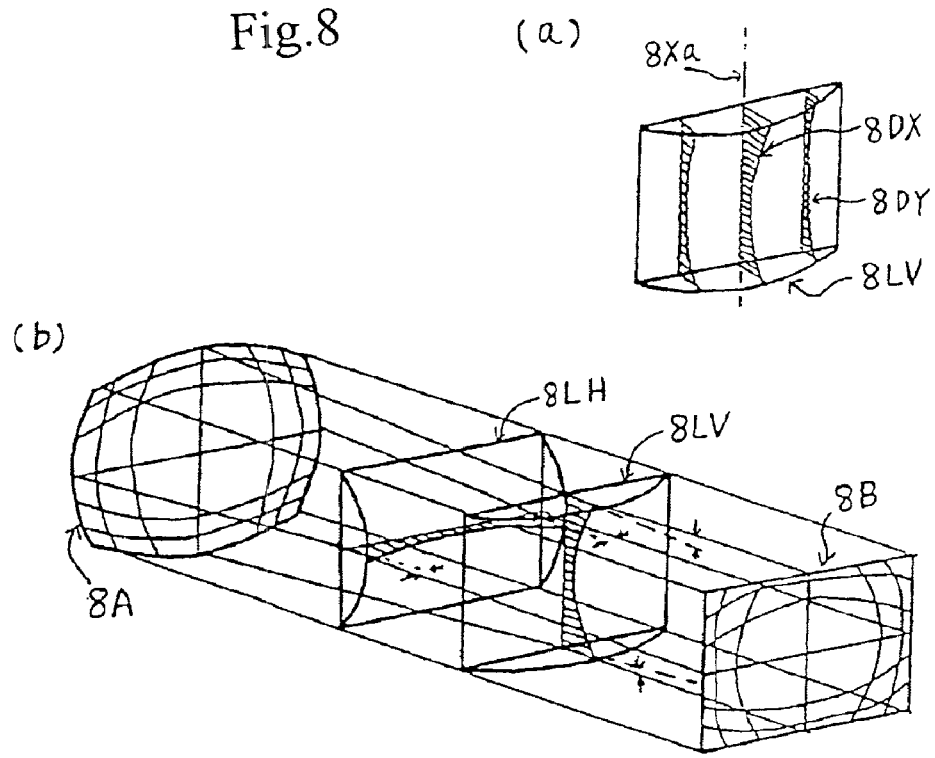

ELECTRONIC ZOOM IMAGE INPUT METHOD

TECHNICAL FIELD

This invention relates to a electronic zoom image input method, that can obtain the zoom image through the fixed focal length image input optical lens, without degrading the zoom image resolution.

BACKGROUND ART

Image input systems such as cameras or camcoders, zoom lenses that can vary their focal length are used widely to obtain zoom images, conventionally.

However, as the zoom lens is highly precision instrument, it is expensive and also large in size. Especially, for the digital zoom cameras that have been required to be small size and low price, conventional zoom lenses were obstacles for these requirements. Furthermore, as image input devices or image sensors such as CCDs have been becoming small in size recently, smaller and shorter focal length zoom lenses have been required for cameras that use these devices.

But, it is very difficult to realize the wide angle zoom lens in short focal length, as it become very small and complicated.

On the other hand, in the case of three-dimensional(3D) zoom image input, accurately synchronized zoom action between two zoom lenses for the left and right images become necessary. As such a synchronized zoom action has to be achieved precisely all in mechanical at the conventional zoom lens, it becomes a very complicated and expensive apparatus. Consequently, the introduction of zoom lens to 3D image input has been very difficult.

Sometimes, in digital cameras, it is called as the electronic telephoto zooming to expand simply a part of the input image electronically. But it differs from a real zoom action, because the resolution of the zoom image is degraded along with its expansion.

DISCLOSURE OF INVENTION

This invention realized a all electronic zoom image input method that do not use conventional optical zoom lens, without degrading the image resolution. And also it solved issues that conventional optical zoom lens had.

The electronic zoom image input method of this invention has a fixed focal length lens that has the function of compressing circumferential part of the input image (it is called as the compressing optical system, thereafter) in combination with a usual image input device with the uniformly aligned pixel. And the output zoom image is realized without degrading image resolution throughout the full zooming range, by processing the image of this compressed input image.

And, an electronic zoom image input method that simplify the zoom image processing by applying the compression optical system that compresses the input image only to the vertical and horizontal directions is introduced.

Also, a compression optical system is introduced that compresses the area close to the vertical and horizontal center axes of the input image, in addition to the compression of the circumferential part of the input image to all direction. It realizes an electronic zoom image input method with much smaller image sensor area.

Furthermore, this compression optical system can be composed as the attachment lens. Conventional digital cameras can be changed to zoom camera systems of this invention, by mounting this attachment compression lens to them.

Attachment conversion lenses have been commonly used to change the equivalent focal length of conventional cameras. In the same way, the focal length of the compression optical system can be changed by mounting the conventional attachment conversion lens to the compression optical system. As the result, a different zooming range can be realized by attaching this attachment conversion lens to this invented method.

3D-image input system can be realized easily, by constructing each image input system of both left and right picture with the electronic zoom image input method of this invention. Because, the accurately synchronized zoom action between the two zoom systems can be easily done by electronic operation in this invention.

Functions of each items of this invention are explained, next.

Usually, in a camera including the digital camera and the camcorder, the zoom image of wide angle or telephoto view is obtained through the zoom lens, by changing its equivalent focal length.

On the other hand, at the electronic image sensor such as CCD, it is possible to expand or compress a part of the input image on the image plane of the image sensor, by processing the image data electronically.

Accordingly, applying this image data processing method, it becomes possible to realize an equivalent zoom function, by changing the area that corresponds to the output image to be taken out from the input image plane of the image sensor.

For example, to change an zoom image from a standard view image to a wide angle view image, the image data of wider area on input image plane that corresponds to the wide angle image is taken out, and is processed as the output image of the wide angle view. In this case, if the area of the zoom input image plane is used proportional to the angle of the view image, the area that is needed to cover the wide angle image becomes very large.

And, if the telephoto view image area on the image plane is taken out as the telephoto output image, its needed area becomes small. But as the number of pixel is reduced by this reduced area, the resolution of the output image becomes degraded. And this method to obtain the telephoto zoom image is used in the conventional digital camera named as the electronic zooming with the sacrifice of degraded resolution.

This indicates that the wider angle view image requires the larger area of input image plane that accompanies higher image resolution as the output image. Because, as the pixel is uniform in density, the larger area on the image plane has more image data. Conversely, the area of input image plane of the wide angle image can be compressed to keep its resolution same to that of the narrower angle image such as the standard angle image.

Accordingly, in the image input system with fixed focal length optical lens and with conventional uniform pixel image sensor, it becomes possible to compose an electronic zoom image input method that has a remarkably suppressed area of the input image plane, by preparing the optical system that compresses the circumferential part of the input image that corresponds to the wide angle part of the input image.

The image through the fixed focal length optical system is a fixed data, having exact correspondence between the object scene and its image. These zoom image information can be freely reproduced as the fixed output zoom image, by the data processing of the image conversion and correction.

For example, to obtain the wide angle output image, the image data of its circumferential part is directly used, because this part has been already compressed at the input image. And the image data of its central part is compressed to the reduced size that corresponds to the narrower area at the wide angle output image. Because this part corresponds to the narrower view image such as the standard view image, and occupies the smaller area at the wide angle output image. As the result, the wide angle output image that has the same resolution to the standard view image is realized with minimum increase of input image area.

It is one of the most important features of this invention that the image sensor with conventional uniform pixel density is used in this invented method, which is made possible by applying non-linear compression of the image data to the compression optical system. And this made it easy to manufacture the sensor, and also easy to process the image data.

However, the pixel of the sensor is not necessarily uniform, and it is also possible to apply non-uniform pixel device. Furthermore, although the invention is explained mainly about the 2-dimension input image plane, the input image plane that is explained here includes even the case of the 1-dimension image sensor that composes the 2-dimension input image plane by scanning it mechanically.

In general, the electronic image data can be easily processed as is treated here. And the zoom output image that is reproduced from the input image data of this electronic image input method can be easily and accurately realized by converting and correcting it electronically.

As the fixed focal length optical system that is introduced to this invented zoom method is a fixed optical system, the input image that passed the optical system is also a fixed image. Accordingly, the compression or distortion pattern and the quantity of the image can also be exactly fixed. And the original correct input image can be reproduced by processing the compressed image that contains the fixed amount of compression and distortion as described above.

The ultra wide-angle optical system as the fish-eye lens that compresses the image uniformly, tends to contain large amount of distortion. As its input image is also fixed one including its distortion through the fixed ultra wide-angle compressing optical system, an ultra wide-angle zoom input image system can be composed by combining the ultra wide-angle optical system to the compressing optical system of this invention, where converting and correcting the wide zoom input image is done simultaneously.

Conventionally, there have been proposals of image sensors called silicone retina. But these sensors have pixels with reduced density at the circumferential part of them, and don't have the zoom function preserving the same image resolution. Consequently, they are different at all from this invention in purpose and in principle.

This invented method is embodied as the image input apparatus equipped with the optical system hat has the function of compressing the circumferential part of the input image. This optical system can also be realized as an attachment lens, that is to be attached to the optical lens of the usual image input apparatus. Accordingly, it is possible to realize the electronic zoom image input method of this invention, by adding this attachment optical system to the conventional image input apparatus such as the photo camera or the camcorder.

Pixels of the electronic image sensor such as CCD are generally arranged uniformly along the length and breadth direction on the image plane. A simplified compressing optical system is introduced that limits the compression of the input image only to the vertical and horizontal direction, in accordance with the direction of the pixel arrangement. And it also results in reducing the amount of the image data processing. By the introduction of this compressing optical system, an electronic zoom input image method, that simplified the image compressing process only to the length and breadth direction, is realized.

At the electronic zoom image input system of this invention, the input image is compressed largely as it moves to its circumferential part. In the case that the rectangular object view is compressed to all the direction, its input image of the area in the diagonal line direction is largely compressed, because this area is at a longer distance away from the central point of the image. On the contrary, its image of the area near in the vertical or horizontal axis line direction is compressed small, because this area is at a shorter distance away from the central point of the image. As the result, the rectangular object view is compressed to a barrel shaped image.

Accordingly, if the area near in the vertical and horizontal axis line direction of this image is compressed furthermore, the barrel shaped input image can be compressed to rectangular shaped one. This rectangular image fits well to the form of the input image plane of the image sensor, and can realize the reduction of the image area itself.

Conventionally, to get a wide range of variable-power optical system, the plural number of zoom lenses that have the different range of focal length has been used, because it is difficult to cover all the power range with one zoom lens.

But, the zooming range of the invented electronic zoom image input method can be changed by adding a conventional attachment fixed focal length lens in front of the compressing optical system. Accordingly, at the electronic zoom image input system of this invention, the zoom action of a wider power range becomes possible by mounting conventional magnifying or telephoto attachment converter lenses with fixed focal length, in front of the compressing optical system of the invention.

The electronic zoom image input system of this invention is appropriately applied to the 3D zoom image input system, which has been very difficult to realize by the conventional zoom lens.

Conventionally, the optical system with two zoom lenses that are interlocked mechanically for 3D-images of the right and left view, has been used to realize the 3D zoom image. Where, these two zoom lenses that are combined mechanically, have to be operated simultaneously and accurately for synchronized zooming and accompanied focusing. It has been very complicated and difficult to realize the zoom operation mechanically.

But, at the electronic zoom image input method of this invention, both of these 3D image input optical systems of the right and left view can be realized by fixed focal length optical systems requiring no zooming and no focusing operations mechanically.

Furthermore, the zoom action can be easily realized by interlocking both image input systems of this invention electronically, because the zoom operation is all done electronically without including any mechanical action.

THE BRIEF EXPLANATION OF THE DRAWINGS

Figure 7:
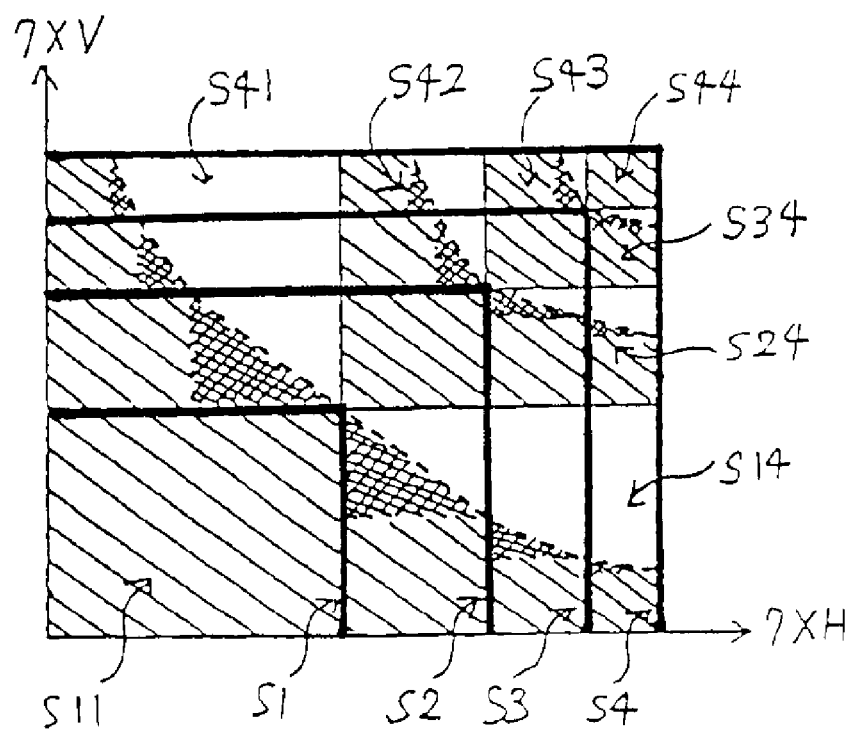
Figure 7:
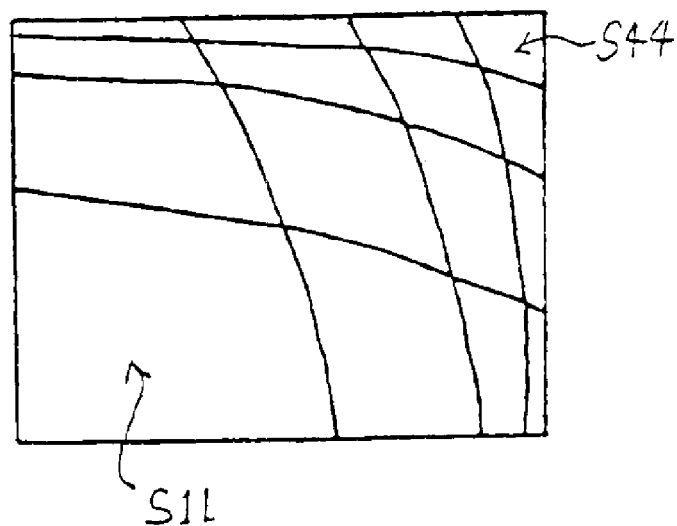

FIG. 7 explains an image compressing method of the image compressing optical system that compresses input image in rectangular, which corresponds to the 3rd embodiment of this invention.

FIG. 8 shows an example of the embodiment of the compressing optical system explained in FIG. 7, that compresses the image in rectangular.

SUCH THE BEST MODE THAT WORKS THE INVENTION

Details of this invention are explained with figures attached.

Figure 1:
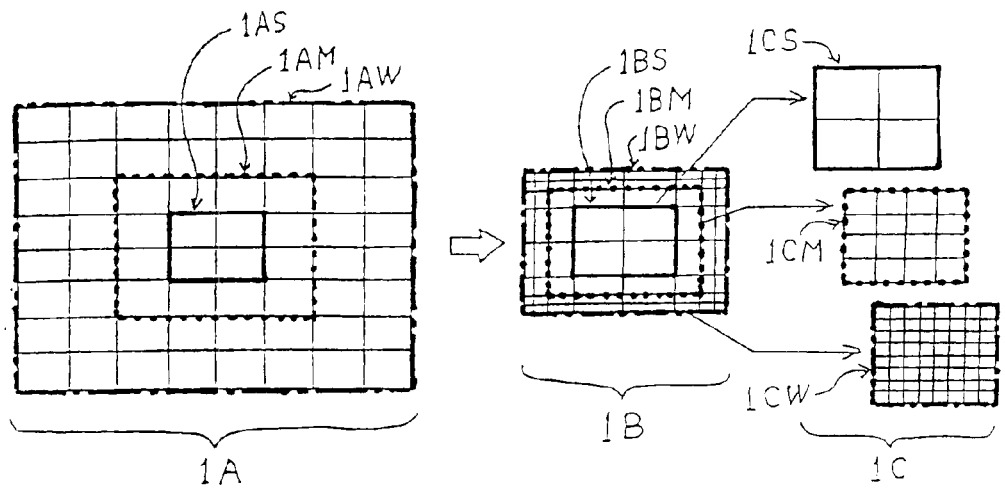
FIG. 1 shows the 1st embodiment of the electronic zoom image input method of this invention.

FIG. 1 shows the 1st embodiment of the electronic zoom image input method of this invention. And it shows the principle of this method.

It is the case that the compression of the image of its circumferential part is limited only to the vertical and horizontal direction.

1A shows the object view of the zoom input image. At the view of 1A, the standard angle view 1AS is settled as the basic angle of view that provides the standard size and the resolution of the output image of this zoom system. And the zoom images of the object view are taken in, as the zoom image changes to wider angle view, from the intermediate angle view 1AM to the more wide angle view 1AW that is expected to have the output image of the same size and resolution to 1AS.

Also, 1B shows the input image at the input image plane of this image sensor, that is formed a compressed zoom image of object scene 1A, by passing the compressing optical system that has the function of compressing the circumferential part of the image.

In order to preserve these output images to the same size and resolution to the standard angle view, it is possible to compress the image area of the circumferential part of the image that corresponds to the outside part of the standard angle view. Accordingly, the input image on the input image plane of the image sensor with uniform pixel density can be compressed more largely to the vertical and horizontal direction as it moves to the circumferential part.

Here in FIG. 1, the area surrounded by the wide line 1BS is the input image corresponding to the standard angle scene 1AS, and also the area surrounded by wide-dotted line 1BM and that by point-dotted line 1BW are corresponded to the intermediate angle scene 1AM and the wide angle scene 1AW respectively.

For example, if the case that the wide angle scene 1AW is settled 4-times wider in length than the standard angle scene 1AS, the size of the wide angle input image 1BW at the input image plane of the image sensor is reduced to about 2 times that of the standard angle input image 1BS in length. It indicates that by the image compression of the invention, a wide zoom image data 4-times wider in length can be reduced to about the half of that in length comparing to the case without the compression, preserving the same image resolution to the standard angle input image 1BS. And the size of the input image plane is reduced to about the half (½) in length and to quarter (¼) in area, comparing to the case that no compression is applied.

Strictly to say, as the compression power at the inner part of the 4-times wide angle image becomes gradually low as it moves toward its central part comparing to that of the circumferential part. As the result the total compression power decreases slightly. Accordingly, the area of the wide-angle image increases slightly than 2 times actually.

The corrected output zoom image 1C is finally obtained from the compressed zoom image, after the processing of the image conversion and correction. In this case, the corrected output zoom image 1CS, 1CM, 1CW corresponds to the object view 1AS, 1AM, 1AW respectively with the same image resolution.

Comparing to the standard angle input image data, the wider angle input image data has the same resolution at its outer edge, and has higher image resolution at its inner part as it moves to its center. Accordingly, the wide-angle zoom output image can be realized at the same resolution to the standard angle image through the image processing of reducing the image data of its inner part.

Although, comparing to the basic standard angle image, the resolution of the corrected wide angle output image may increase or decrease slightly in local depending upon the local variation of the degree of compression, the increase of the input image area of the image sensor can be restrained by the electronic zoom input system of this invention.

Figure 2:
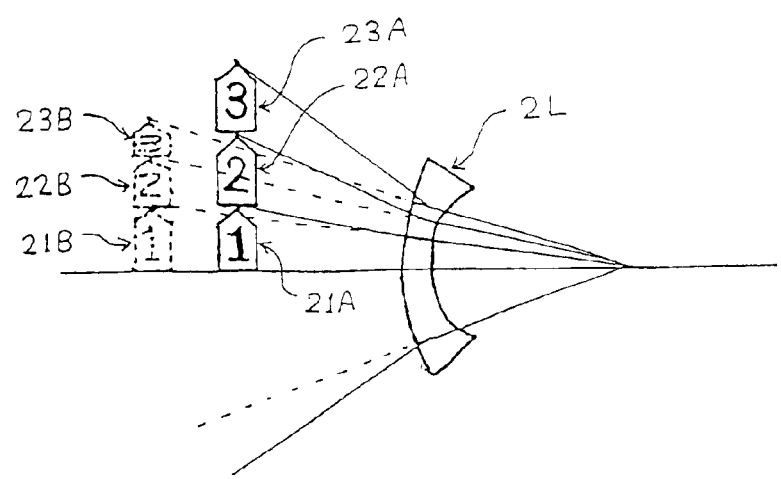
FIG. 2 shows an example of the optical system that compresses the circumferential part of the input image.

FIG. 2 shows an example of the optical system that compresses the circumferential part of the input image. It is composed of the concave lens 2L, which has the refraction angle that increases as the view angle moves to the circumferential part, as is shown in this figure. Namely, when images of three objects 21A, 22A, and 23A of the same size are passed through the concave lens 2L, these images are compressed largely as the position of the object image moves to the circumferential part by the compression characteristics of the lens 2L, as shown 21B, 22B, and 23B respectively.

As the compressing optical system is that of a fixed focal length, the compressed zoom input image is the fixed image, including its containing distortion. So, it is possible to obtain the correct output image, by the accurate converting and correcting process of the compressed image.

Even if there is some deviation in the degree of compression of the compressing optical lens of this invention, its influence is limited to the slight change of the image resolution. Because, the output image itself is obtained as a corrected one by the reverse conversion of the fixed image compression mode. And its distortion does not relate directly to the image compression mode itself.

Furthermore, aspherical lenses like this compression lens can be easily realized by materials such as plastic lenses, nowadays.

Figure 3:
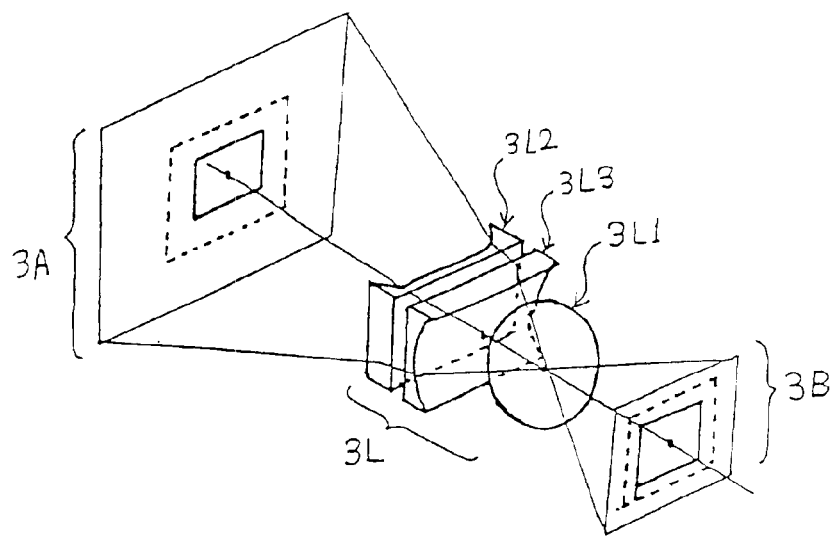
FIG. 3 shows an example of the optical system that compresses the circumferential part of the image toward the vertical and horizontal direction that corresponds to the 1 st embodiment of this invention.

FIG. 3 shows an embodiment of the fixed focal length compression optical system 3L that compresses the circumferential part of the input image toward the vertical and horizontal direction as explained above. 3L is composed of three kind of lenses; the conventional fixed focal length convex lens 3L1 for image focusing the vertical concave cylindrical lens 3L2 that compresses largely as the part moves to the circumferential part in horizontal direction, and the horizontal concave cylindrical lens 3L3 that compresses like 3L2 in vertical direction. Needless to say, the optical system 3L can be realized as a single complex function lens like an aspherical lens.

In FIG. 3, the image of the object view 3A is compressed through the compressing optical system 3L to the image 3B on the input image plane. Where, 3A and 3B correspond respectively to 1A and 1B of FIG. 1.

Conventionally, Cinema Scope has been well known in movie that compresses and enlarges the image of the screen in horizontal direction. The image at Cinema Scope is simply compressed and enlarged in proportional to horizontal direction to obtain the enlarged screen. Consequently, it is entirely different system in purpose and in principle from the electronic zoom image input method of this invention that realizes the zoom function through the data processing with non-linear image compression.

Figure 4:
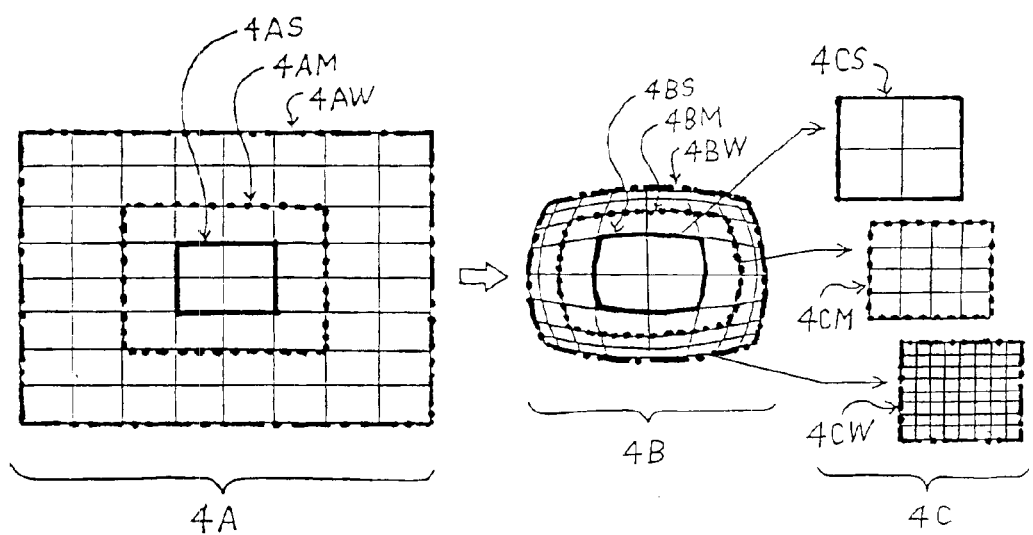
FIG. 4 shows the 2nd embodiment of the electronic zoom image input method of this invention.

FIG. 4 shows the 2nd embodiment of the invented method. This is the case that the compressing optical system compresses the circumferential part of the input image to all direction.

This optical system compresses largely at the outer side of the input image in concentric circle. As the result, the object view 4A is compressed through this compressing optical system to the barrel shaped compressed input image 4B. Just like the case of FIG. 1, the standard angle view 4AS, the intermediate angle view 4AM, and the wide angle view 4AW in 1A are compressed to the compressed zoom input image of 4BS, 4BM, and 4BW in 1B respectively.

As this compressed zoom input image is also the fixed electronic data through the fixed compression optical system, the accurate image processing of correcting or converting the compressed zoom input image to the corrected output zoom image can be easily done. Through the image processing the output zoom image 4C is obtained. Where the output image of standard angle view 4CS, the intermediate angle view 4CM, and the wide angle view 4CW corresponds to the input image of object view 4AS, 4AM, and 4AW respectively. And these output images preserve the same image resolution to the standard view image 4CS.

Figure 5:
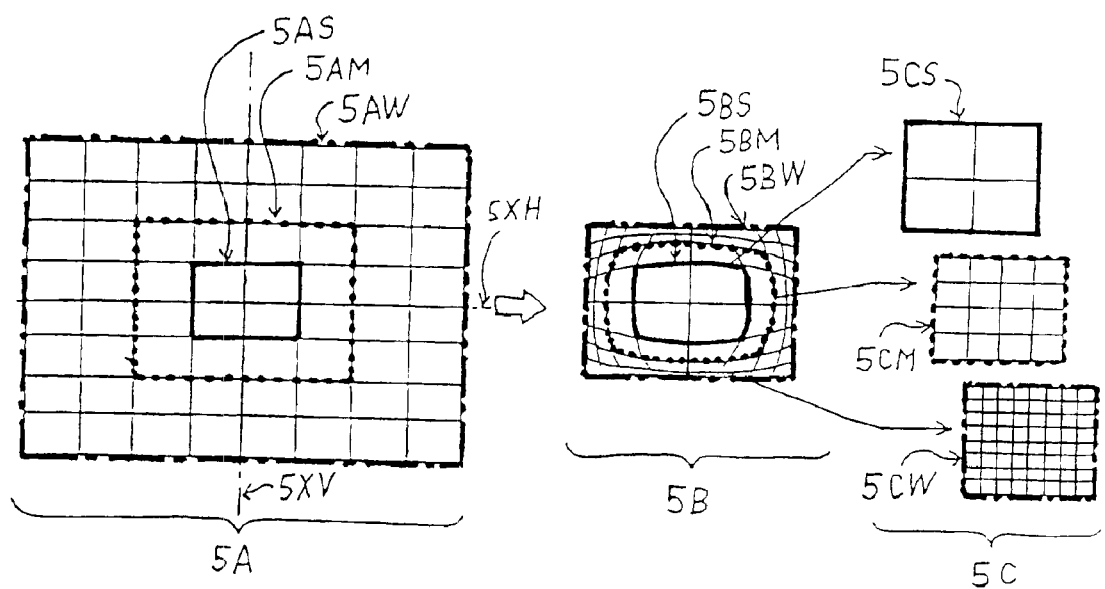
FIG. 5 shows the 3rd embodiment of the electronic zoom image input system of this invention.

FIG. 5 shows the 3rd embodiment of the electronic zoom image input method of this invention. Even in the compressed zoom input image such as 1B in FIG. 1 or 4B in FIG. 4, there are areas that contain excessive image data to maintain the same image resolution at the neighboring area of the vertical and horizontal center axes of the image that correspond to the swelled part of the barrel type zoom input image of 4B.

By preparing a compressing optical system that compresses the swelled part of the image 4B further more, a compressed zoom input image that has a rectangular shaped outline can be realized. Namely, by the image compression that compresses further at the neighboring area of the vertical and horizontal center axes 5XV and 5XH of 5A, the object scene 5A is compressed to the compressed zoom input image 5B that has the smaller area than 4B and the rectangle shaped outline.

And the standard angle view 5AS, the intermediate angle view 5AM, and the wide angle view 5AW of 5A is compressed to the compressed zoom input image 5BS,5BM, and 5BW of 5B respectively.

Furthermore, the output zoom image 5C is obtained through the image processing where the input image of object scene 5AS,5AM, and 5AW are reproduced as the corrected output zoom image 5CS,5CM, and 5CW respectively. The electronic zoom image input method of FIG. 5, that preserves the same zoom image resolution to that of FIG. 1 and FIG. 4, has been realized with the sensor that has the smaller and rectangular image input plane.

Figure 6:
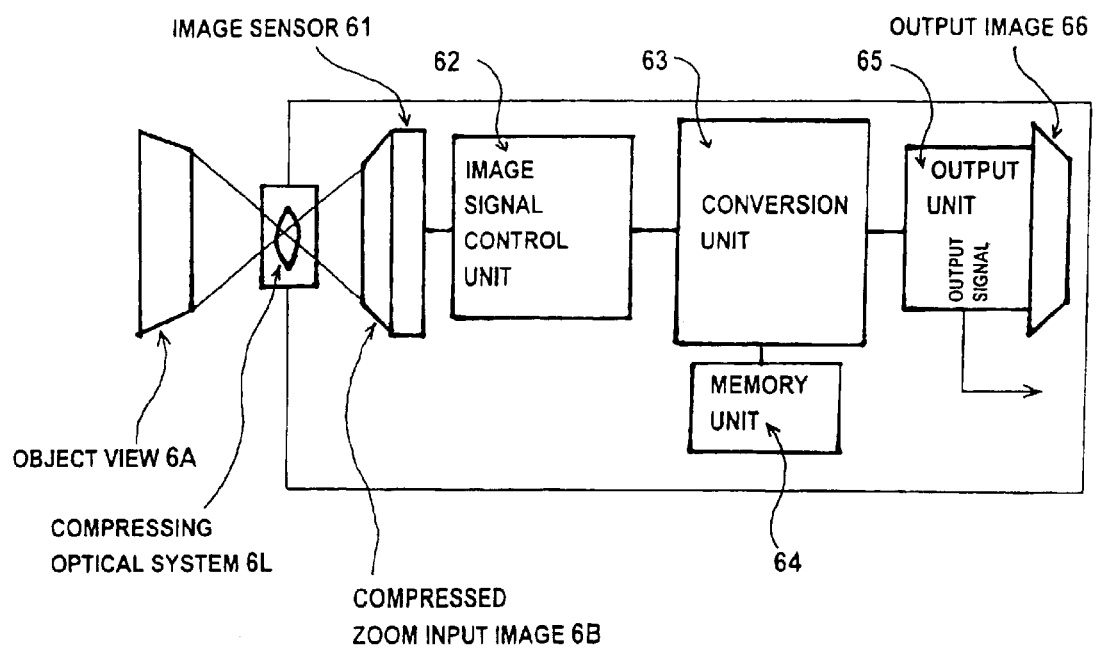
FIG. 6 shows an example of the construction of the invented electronic zoom image input method.

FIG. 6 shows an example of the constitution of the electronic zoom image input method of this invention that is shown in FIG. 5.

It is also same to that of FIG. 1 and FIG. 4, except the difference of the compressed zoom input image 5B to that of 1B and 4B by the difference of each compressing optical system.

The image of the object view 6A is taken in through the compressing optical system 6L as the compressed zoom input image 6B at the input image plane of the image sensor 61. The image data of the input image 6B is changed to the digital image signal by the image signal control unit 62.

This digital signal can be reproduced to the original object view image of any angle, through the image processing of the conversion from the compressed zoom input image at the conversion unit 63. These zoom images are taken out from the output unit 65 as the output image 66 or the output signal.

The output image data that is processed to a fixed angle of zoom image is stored at the memory unit 64. But the compressed zoom input image data of the input image plane can also be stored at the memory unit 64 directly. If the image data is stored as the compressed image data, it become possible to take out any angle of zoom output image from the compressed image data with the same image resolution by processing the stored image data at the memory unit 64.

FIG. 7 explains the method of the image compression to realize the input image 5B of FIG. 5 compressed in rectangular outline.

At first, the image compressing method of this invention is explained by a simple example of the compressed input image 1B of FIG. 1.

The compressed zoom input image 1B in FIG. 1 that is compressed only to the vertical and horizontal direction, contains the prolix image data at the neighboring areas of the vertical and horizontal center axes as largely as it moves to the outside area. And it is possible to compress these part furthermore, without causing the degradation of the zoom image resolution.

To simplify the explanation, FIG. 7(a) shows the part of the compressed zoom input image 1B that corresponds to its 1st quadrant. In the FIG. 7(a), the area enclosed by the wide line S1 corresponds to a quarter of the standard angle input image 1BS in FIG. 1. And in the same way, the area enclosed by the wide line S2 and S4 corresponds to the 2-times wide angle input image 1MS, and the 4-times wide angle input image 1WS comparing to the standard angle view respectively.

Also, the 3-times wide input image area that is enclosed by the wide line S3 is shown between S2 and S4 in FIG. 7(a).

For example, when the zoom input image is expanded from 3-times wide angle image to 4-times wide angle image, the area that is newly expanded at the compressed zoom input image is that surrounded by S4 and S3. It includes the area on diagonal line S44, areas arranged to the horizontal direction S43,S42,S41, and areas arranged to the vertical direction S34,S24,S14.

The area of S43,S42,and S41 is ⅓ times. 2-times, and 4 times larger comparing to S44 respectively, as it approaches to the vertical center axis 7XV. As the image sensor is composed of uniform density pixels, the size of the image area is proportional to that of the image data. And these image area have more image data in proportional to their area. The image area described above is arranged S44,S43, S42,S41 in horizontal direction as is shown in FIG. 7(*a*).

However, the required image data for these image areas that are necessary to realize the 4-times wide angle zoom output image are just same to that of standard angle S44. And it is shown for the each image areas of S43,S42,S41, as the area of oblique line that is equivalent to the area of S44. This indicates that to maintain the same output image resolution, the area of these image area can be reduced to that of S44. Accordingly, the area of S43,S42,S41 can be reduced to ¾, ½, ¼ respectively.

The image area S34,S24,S14 that are arranged in vertical direction to the horizontal center axis 7XH, can be also reduced by the same way as described above for horizontal direction.

By the same way as described above about the image areas of S4 for 4-times wide angle zoom input image, it is possible to reduce the size of image areas of S3 for the 3-times wide angle zoom input image, and also that of S2 for 2-times wide angle zoom input image respectively.

In FIG. 7(*a*), areas equivalent to the image data that are necessary to realize the electronic zoom function with constant image resolution, are shown as the area of oblique line for the all image areas.

To simplify the explanation of this zoom function, it has been explained for the case that the zoom power changes in step in integer such as 2,3,4-times. But, the actual zooming function is done continuously. And the compression of the zoom image is also changed continuously. As the compressed input image of a zoom-power always contains the lower-power zoom image part in its inner area, the area of the compressed image actually increases slightly than that described above.

By taking the continuous change of the zooming power in calculation, the increase of the area of the zoom input image plane for the zoom-power N becomes to the natural logarithm N (InN) in length. And the area increases slightly comparing to the case explained above that estimated the zoom-power changes in step.

These factors to increase the area is shown by the dotted line, and the increased area is also shown by the oblique lattice line in FIG. 7(*a*).

As the result, the minimum data area to realize the electronic zooming with constant resolution is shown in FIG. 7(*a*) as the sum of the area of oblique line and the area of oblique lattice line. The blank area in the image area at FIG. 7(*a*) indicates the area that is possible to compress.

The compressed zoom input image that is composed by these compression is finally shown FIG. 7(*b*). In FIG. 7(*b*), the zoom input image is compressed furthermore for the blank area that is shown in FIG. 7(*a*) as the possible area to compress. And the compressed image area becomes the rhombic form. Finally, the outline of the compressed zoom input image is compressed to the rectangular shape.

The compressed zoom image of FIG. 7(*b*) is that of the 1st quadrant part. And the image extended to all quadrant is equal to the compressed zoom input image 5B that is the 3rd embodiment of the invention.

As is explained in FIG. 4, the compressed zoom input image of the rectangular object scene becomes the barrel shaped one when it is compressed to all direction. The compressed zoom input image of the further reduced in rectangular shaped outline can be obtained by adding the compressing optical system that compresses the swelled part of the barrel shaped input image. And the input image is compressed to rectangular outline as shown in FIG. 5 finally. In this case, to make the outline of the zoom input image rectangle is very effective to reduce the area of the image sensor, even if the compression is insufficient.

FIG. 8 shows a example of the compressing optical system that realizes the compressed zoom input image 5B of FIG. 5 from the input image 4B of FIG. 4. The action of image compression is explained for the case of vertical direction at first. The concave lens optical system 8LV that compresses the image to vertical direction more largely as it moves to the center axis 8Xa is introduced to compress the swelled part of the barrel type input image.

The optical system 8LV is shown in FIG. 8(*a*). The degree of the compression of the image becomes maximum at the vertical center axis 8Xa as is shown at the section 8DX. And the degree of the compression decreases as it goes away from the center axis 8Xa as is shown at the section 8DY.

The compressing optical system of FIG. 8(*b*) is realized by combining the compressing optical system of vertical direction 8LV and that of horizontal direction 8LH together. And by passing the barrel type compressed zoom input image 8A through this optical system, the compressed zoom input image 8B that is equal to the image 5B can be obtained.

If the function of the vertical and horizontal cylindrical convex lens is added to 8LV and 8LH respectively, the output image from the optical system 8B can be compressed to be adjusted to the size of image sensor, by compressing the image to the vertical and horizontal direction freely through the cylindrical lens.

These optical functions or lenses that compose the optical system can be combined to a composite lens as a plastic lens.

THE INDUSTRIAL APPLICABILITY

It became possible to realize the simple zoom image by the electronic zoom image input method of this invention without degrading the zoom image resolution it does not use the conventional zoom lens, and provides the simple fixed focus length lens.

This zooming method of the invention made it possible to use the simple fixed focal length lens and conventional small size image sensor with uniform pixel. And the remarkably small size and low cost zoom image input system that could not realized hitherto, is materialized by this invention.

Furthermore, it became possible to realize the extremely small and low cost 3D-camera by combining two electronic zoom image input system of this invention electronically, that had been very expensive, large, and complicated one conventionally combining two optical zoom lenses. This invention made the conventional optical 3D-zoom lens system absolutely unnecessary that needed two optical zoom lenses combined mechanically.

This electronic zoom image input system of the invention materialized the strong features of small size, low cost, and the 3D-zoom function to the market.

In the remarkably progressing multi-media era, zoom imaging system such as the zoom camera has been strongly required to be more small sized, low cost, and versatile. This invention realized just to solves these issues that could not fulfilled hitherto. Accordingly, this invention accomplish the great contribution to the progress of the coming multi-media era.

What is claimed is:

1. An electronic zoom image input method that enables zooming without degrading the resolution, by comprising a fixed focus input image compressing optical system to form a compressed zoom input image having a function of compressing the input image more largely as it moves to the circumferential part, an image sensor to receive the compressed zoom input image with reduced input image plane area providing preferably uniform pixel density, and a conversion unit for the processing of the zoom image converting and correcting of the compressed zoom input image to reproduce zoom output images.

2. An electronic zoom image input method that enables zooming without degrading the resolution, by comprising a fixed focus input image compressing optical system to form a compressed zoom input image having a function of compressing the circumferential part of the input image in logarithmic function, an image sensor to receive the compressed zoom input image with reduced input image plane area, and a conversion unit for the processing of the zoom image converting and correcting of the compressed zoom input image to reproduce zoom output images.

3. An electronic zoom image input method claimed in claim 1, that has a fixed focus input image compressing optical system where the compression of the circumferential part of the input image is limited to the vertical and horizontal direction.

4. An electronic zoom image input method claimed in claim 1, that has an image sensor with a rectangular input image plane, and a fixed focus input image compressing optical system with a function of compressing the circumferential part of the input image to all direction, and compressing further the neighboring part of the vertical and horizontal axes of the input image.

5. An electronic zoom image input method claimed in claim 1, or claim 2, or claim 3, or claim 4, where a fixed focus input image compressing optical system that compresses the circumferential part of the input image is comprised as an attachment optical system.

6. An electronic zoom image input method claimed in claim 1, or claim 2, or claim 3, or claim 4, that has a different zooming range, by mounting a fixed focus attachment conversion lens to the fixed focus input image compressing optical system to change its total focal length.

7. A 3D electronic zoom image input method whose right and left image input optical systems are organized by fixed focus input image compressing optical systems of the electronic zoom image input method claimed in claim 1, or claim 2, or claim 3, or claim 4.

* * * * *